United States Patent
Ramalho et al.

(10) Patent No.: US 10,284,484 B1
(45) Date of Patent: May 7, 2019

(54) ACCELERATED RAMP UP FOR DELAY-BASED RATE ADAPTATION

(71) Applicant: Cisco Technology, Inc., San Jose, CA (US)

(72) Inventors: Michael Anthony Ramalho, Lakewood Ranch, FL (US); Xiaoqing Zhu, Austin, TX (US); Paul Edwin Jones, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 14/799,922

(22) Filed: Jul. 15, 2015

(51) Int. Cl.
*H04L 12/825* (2013.01)
*H04L 12/875* (2013.01)

(52) U.S. Cl.
CPC ............ *H04L 47/562* (2013.01); *H04L 47/25* (2013.01)

(58) Field of Classification Search
CPC ....... H04L 47/562; H04L 47/25; H04L 47/10; H04L 43/0864; H04L 47/263
See application file for complete search history.

(56) References Cited

U.S. PATENT DOCUMENTS

| | | | | |
|---|---|---|---|---|
| 5,936,940 A | * | 8/1999 | Marin | ................. H04L 12/5602 370/232 |
| 7,974,195 B2 | | 7/2011 | Jin et al. | |
| 2002/0150048 A1 | * | 10/2002 | Ha | ........................ H04L 1/1887 370/231 |
| 2014/0372623 A1 | * | 12/2014 | Chen | ...................... H04L 47/30 709/231 |
| 2015/0156129 A1 | * | 6/2015 | Tsuruoka | .............. H04L 47/193 370/235 |

OTHER PUBLICATIONS

Jacobson, V. Congestion avoidance and control. In Proceedings of SIGCOMM '88 (Stanford, CA Aug. 1988), ACM.*
Bolot Oct. 1993 End-to-End Packet Delay and Loss Behavior in the Internet. ACM SIGCOMM Computer Commnication Review Oct. 1993.*
"Effects of latency and packet loss on TCP throughput"; filipv.net; Jun. 19, 2013; pp. 1-4.
Wei et al. "FAST TCP: Motivation, Architecture, Algorithms, Performance"; Engineering & Applied Science, Caltech http://netlab.caltech.edu; pp. 1-14.
"TCP congestion-avoidance algorithm"; Wikipedia; https://en.wikipedia.org/wiki/TCP_congestion_avoidance_algorithm; pp. 1-6.

(Continued)

*Primary Examiner* — Jeffrey M Rutkowski
*Assistant Examiner* — Basil Ma
(74) *Attorney, Agent, or Firm* — Behmke Innovation Group LLC; James Behmke; Stephen D. LeBarron (57) ABSTRACT

In one embodiment, a device in a network sends a first set of one or more packets at a first rate to a destination in the network. The device determines a queuing delay reporting time. The queuing delay reporting time represents an amount of time before an indication of a queuing delay associated with the sent first set of one or more packets is reported back to the device. The device determines a second rate based on the determined queuing delay reporting time and on a maximum allowable delay. The device sends a second set of packets at the second rate to the destination.

18 Claims, 6 Drawing Sheets

(56) References Cited

OTHER PUBLICATIONS

Armitage et al. "Using Delay-Gradient TCP for Multimedia-Friendly 'Background' Transport in Home Networks"; Oct. 2013; pp. 1-7.
S. Floyd "Congestion Control Principles"; Network Working Group; ACIRI; Sep. 2000; pp. 1-17.
M. Thornburgh "Adobe's Secure Real-Time Media Flow Protocol"; Internet Engineering Task Force (IETF); Adobe; Nov. 2013; pp. 1-113.

* cited by examiner

ACCELERATED RAMP UP FOR DELAY-BASED RATE ADAPTATION

TECHNICAL FIELD

The present disclosure relates generally to computer networks, and, more particularly, to an accelerated ramp up mechanism for a computer network.

BACKGROUND

Accelerated ramp up generally refers to a collection of networking mechanisms that adjust the rate at which packets are sent during initial session startups and/or during operational periods where there is a desire to quickly use excess capacity, if available. For example, accelerated ramp up techniques are typically used for multimedia traffic, such as video streaming, audio streaming, etc., to quickly establish a session between devices by continually increasing the rate at which packets are sent. However, too slow of a ramp up may result in a poor user experience. For example, in the case of video traffic, this may result in poor video quality for a period of time until the final screen resolution is achieved. Conversely, too fast of a ramp up may lead to undesired delays in the network. For example, if multiple video traffic flows are flowing through the same networking device, increasing the packet rates of the flows too aggressively may lead to congestion over the path, potentially resulting in delays and/or losses that may impair the end-to-end performance of the flows.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network sends a first set of one or more packets at a first rate to a destination in the network. The device determines a queuing delay reporting time. The queuing delay reporting time represents an amount of time before an indication of a queuing delay associated with the sent first set of one or more packets is reported back to the device. The device determines a second rate based on the determined queuing delay reporting time and on a maximum allowable delay. The device sends a second set of packets at the second rate to the destination.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
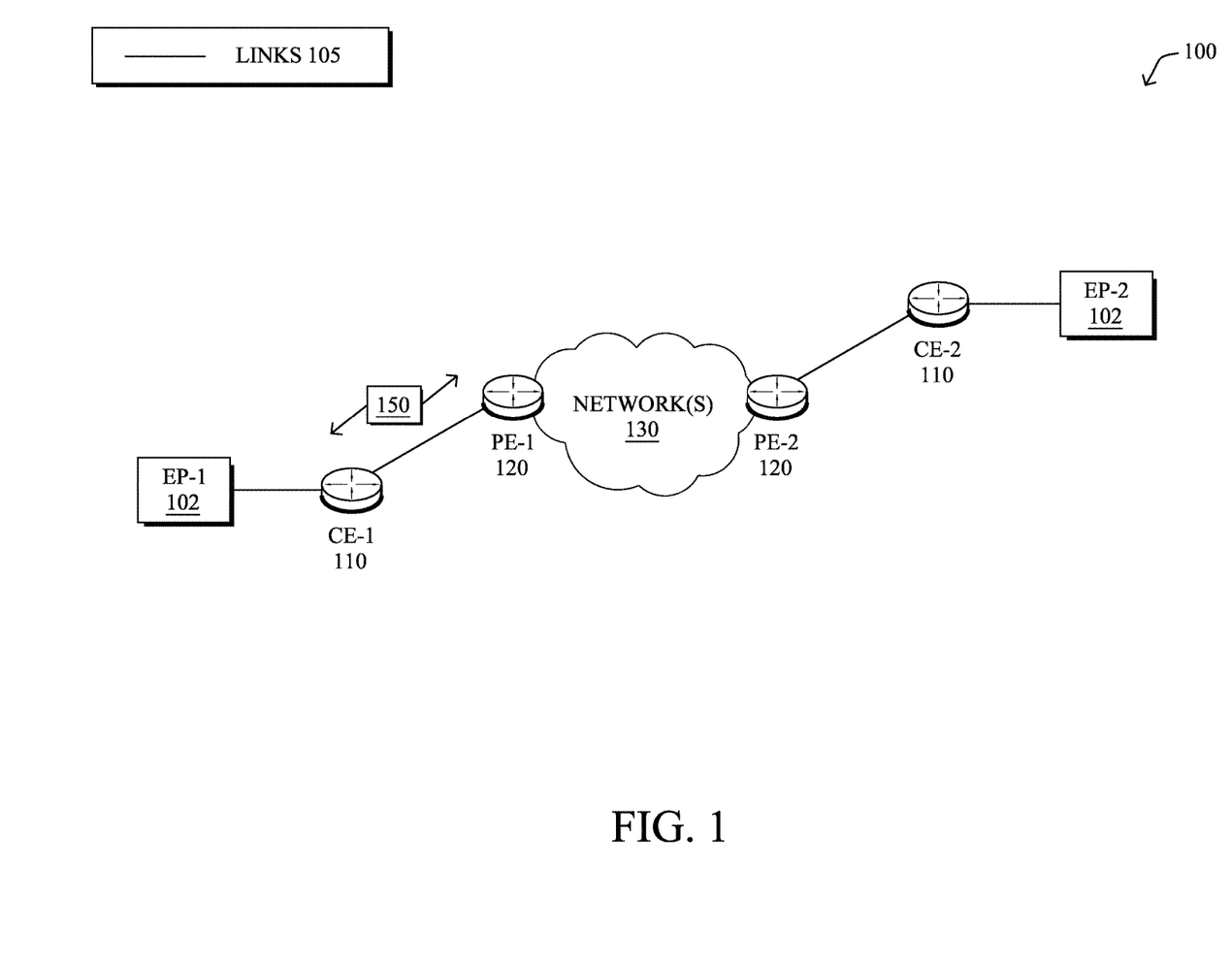
FIG. 1 illustrates an example communication network.

FIG. 1 is a schematic block diagram of an example communication network 100 illustratively comprising nodes/devices, such as a plurality of routers/devices interconnected by links or networks, as shown. For example, customer edge (CE) routers 110 (e.g., CE-1, CE-2, etc.) may be interconnected with provider edge (PE) routers 120 (e.g., PE-1, PE-2, etc.) in order to communicate data packets 150 across a core network, such as an illustrative network backbone 130. For example, routers 110, 120 may be interconnected by the public Internet, a multiprotocol label switching (MPLS) virtual private network (VPN), an Internet of Things (IoT) network, combinations thereof, or the like. Data packets 150 (e.g., traffic/messages) may be exchanged among the nodes/devices of the communication network 100 over links 105 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

As shown, various endpoint (EP) devices 102 (e.g., EP-1, EP-2, etc.) may communicate by sending data across communication network 100 via routers 110, 120. For example, EP-1 may communicate a data packet 150 to EP-2 by sending the packet to CE-1 which, in turn, causes the data packet 150 to be routed to the destination EP-2 (e.g., via PE-1, PE-2, CE-2, etc.). As would be appreciated, devices 102 may be, but are not limited to, servers, personal computers, portable electronic devices (e.g., tablets, smart phones, wearable devices, etc.), cloud-based or virtual devices, or the like.

Figure 2:
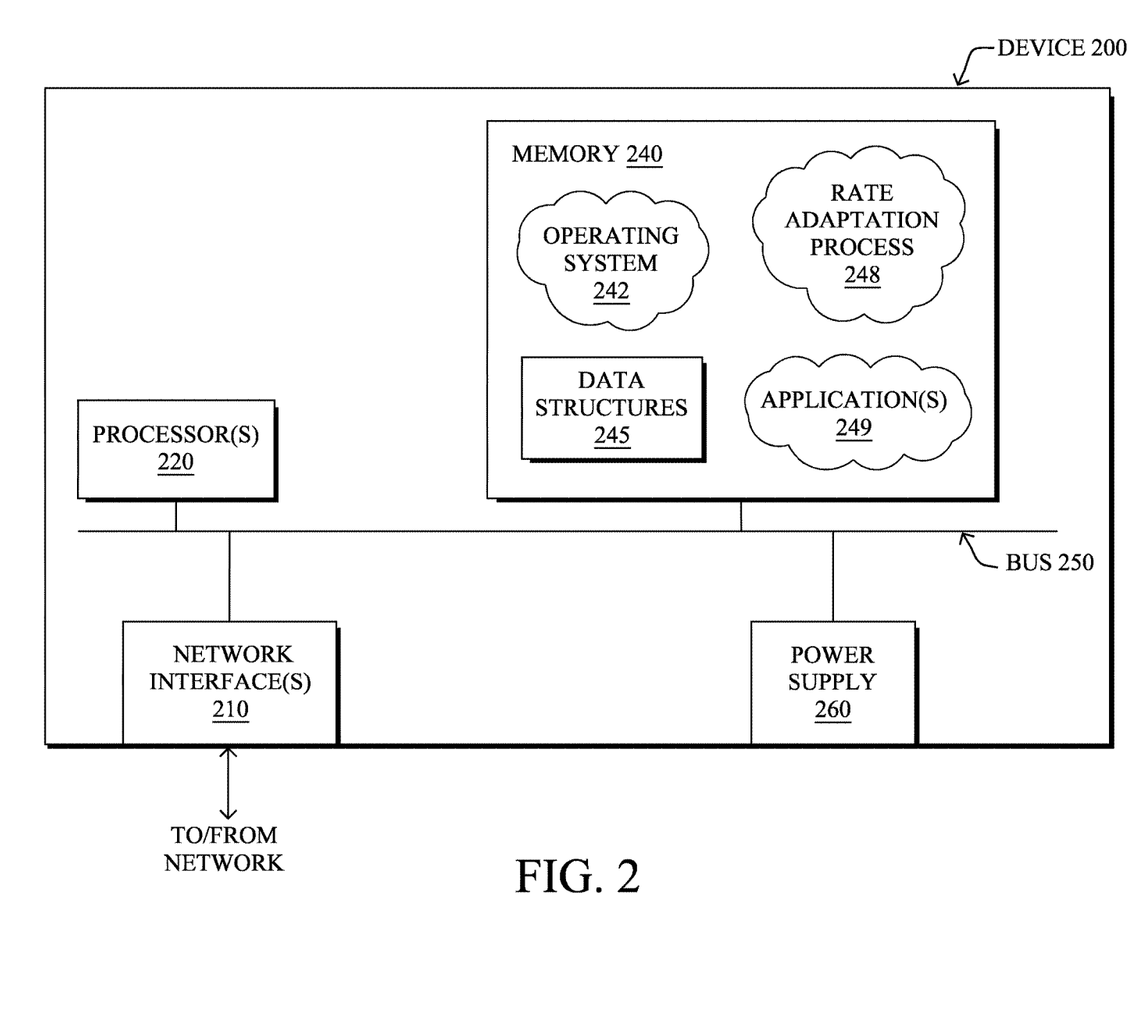
FIG. 2 illustrates an example network device/node.

FIG. 2 is a schematic block diagram of an example node/device 200 that may be used with one or more embodiments described herein, e.g., as any of the computing devices shown in FIG. 1, particularly the PE routers 120, CE routers 110, EP devices 102, or any other computing device that supports the operations of network 100 (e.g., intermediary devices, etc.). The device 200 may also be any other suitable type of device depending upon the type of network architecture in place. Device 200 comprises one or more network interfaces 210, one or more processors 220, and a memory 240 interconnected by a system bus 250, and is powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art. Network interface(s) 210 may also provide device 200 with wired (e.g., Ethernet, fiber optic, etc.) and/or wireless connectivity (e.g., WiFi, Bluetooth, cellular, etc.) to a communication network, in various embodiments.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise one or more applications 249 and illustratively, a rate adaptation process 248, as described herein, any of which may alternatively be located within individual network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Application(s) 249 may include any number of applications operable to cause device/node 200 to communicate with another device via a communication network. For example, application(s) 249 may include, but are not limited to, a multimedia application (e.g., video, audio, etc.), an email application, a file transfer application, a browser application, an enterprise resource planning (ERP) application, a navigation application, a social media application, or any other application that causes device 200 to transmit or receive data packets via network interface(s) 210.

According to various embodiments, rate adaptation process 248 may be operable to perform a ramp up of the packet rate associated with any of applications 249. As would be appreciated, rate adaptation process 248 may be implemented as part of a particular application 249, as part of operating system 242, within network interface(s) 210, or even in a distributed manner, in various embodiments. In general, rate adaptation process 248, when executed by processor(s) 220, may cause device 200 to adjust the packet rate associated with a particular type of traffic (e.g., from any of applications 249). For example, rate adaptation process 248 may ramp up the packet rate of certain types of traffic (e.g., multimedia application traffic).

Figure 3:
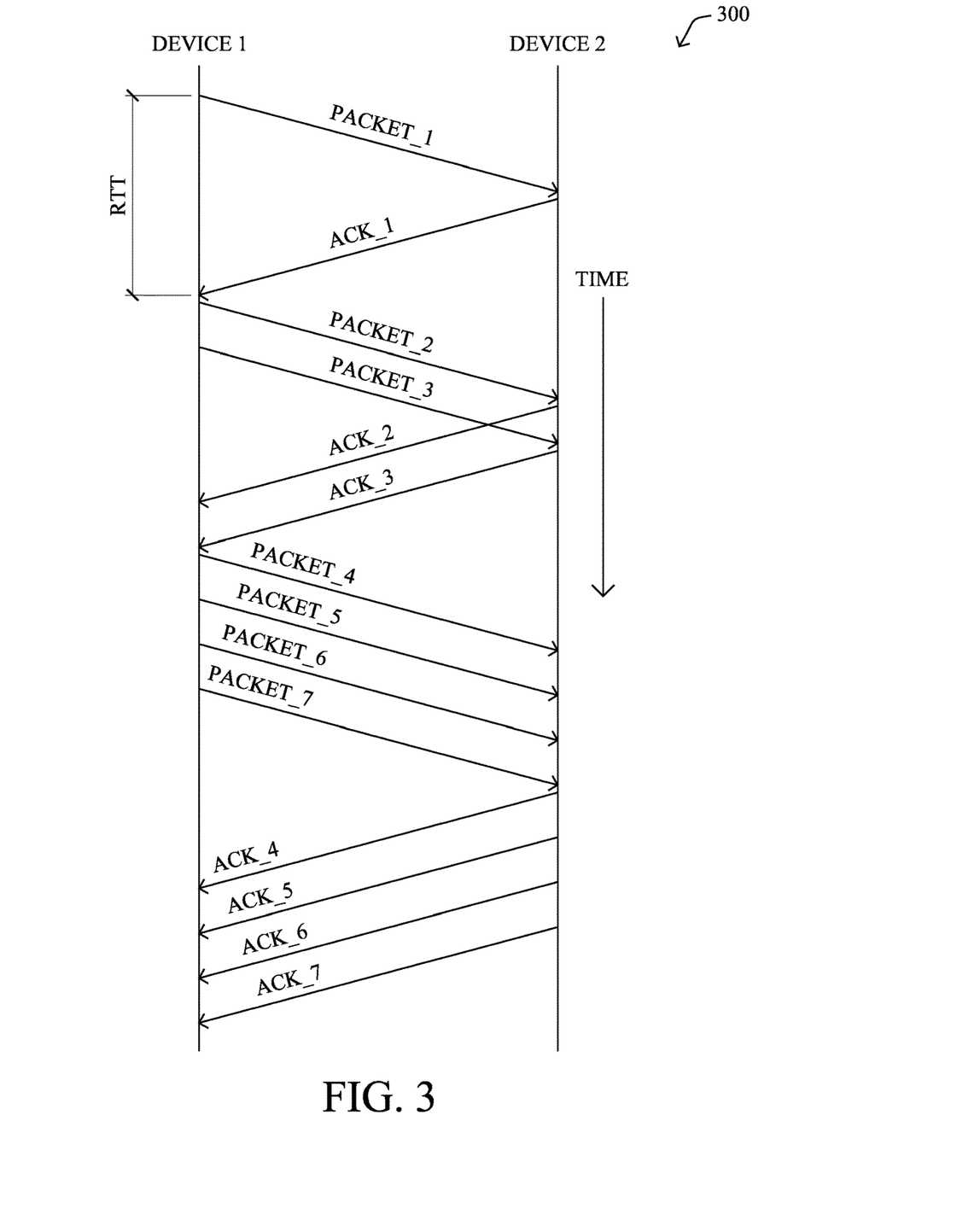
FIG. 3 illustrates an example packet rate ramp up mechanism.

Referring now to FIG. 3, an example of a packet rate ramp up mechanism 300 is shown, according to some embodiments. In the example shown, assume that a first device (e.g., device 1, such as device 200 described above) initiates a communication session with a second device (e.g., device 2) by sending packets to the second device. The first device may begin the session by sending a single packet (e.g., Packet_1) or an initial set of packets to device 2. In response to receiving the sent packet(s), the second device may provide an acknowledgement back to the first device, such as a TCP ACK. In general, the amount of time between when a packet is sent and when a corresponding acknowledgement is received is referred to as a round trip time (RTT) between the devices.

To facilitate session startup, the first device may increase the rate at which it sends packets to the second device during each ramp up cycle (e.g., via execution of rate adaptation process 248). For example, as shown, the first device may double the number of packets that it sends during the next cycle (e.g., by sending both Packet_2 and Packet_3), after completion of the first cycle. Then, after completion of this cycle, the first device may again double the number packets that it sends during the next cycle (e.g., by sending Packet_4 through Packet_7). Assuming that each packet is approximately of the same size, doing so means that the bandwidth consumed by the sending application also approximately doubles during each cycle.

Typically, the rate increase per cycle used by a ramp up mechanism is governed by a set factor. For example, the ramp up shown in FIG. 3 can generally be represented as a geometric progression as follows:

$$r_i = r_0 * c^i$$

where $r_i$ is the packet rate during the $i^{th}$ ramp up cycle, $r_0$ is the initial packet rate, and c is a preselected constant factor. For example, TCP Slow Start mandates using a factor of c=2, thereby doubling the packet rate each cycle. If each packet is approximately the same size, this also means that the bandwidth effectively doubles each round.

As would be appreciated, continually increasing the packet rate of an application will eventually cause the network path to reach its maximum capacity, due to the physical limitations of the devices and/or links along the path. For example, during any given cycle, a bottleneck may occur at any of the networking devices along the path, leading to queuing delays. In such a case, in response to being notified about the queuing delays, the ramp up mechanism may back off the packet rate. However, until the queuing delays are resolved, this may disrupt the traffic flow and lead to a poor user experience with certain types of application traffic, such as multimedia traffic. In addition, the bottleneck event may also impinge on other traffic flows that are also flowing through the bottlenecked device.

Accelerated Ramp Up for Delay-Based Rate Adaptation

The techniques herein provide a ramp up mechanism that is guaranteed to increase the estimated bandwidth as quickly as possible, while subject to a worst case performance constraint. Notably, in some aspects, the techniques herein may be used to guarantee that the ramp up of a particular flow will never add more than n-number of seconds to the bottleneck queue at any given cycle/rate update. By guaranteeing that the queuing delay contributed by any rate increase is bounded, this may also prevent or mitigate the negative effects on other flows passing through the bottlenecked device.

Specifically, according to one or more embodiments of the disclosure as described in detail below, a device in a network sends a first set of one or more packets at a first rate to a destination in the network. The device determines a queuing delay reporting time. The queuing delay reporting time represents an amount of time before an indication of a queuing delay associated with the sent first set of one or more packets is reported back to the device. The device determines a second rate based on the determined queuing delay reporting time and on a maximum allowable delay. The device sends a second set of packets at the second rate to the destination.

Illustratively, the techniques described herein may be performed by hardware, software, and/or firmware, such as in accordance with the rate adaptation process 248, which may include computer executable instructions executed by the processor 220 (or an independent processor of interfaces 210) to perform functions relating to the techniques described herein, e.g., in conjunction with application(s) 249.

Operationally, rate congestion control techniques are introduced herein for use with the various forms of network traffic, such as traffic associated with interactive, real-time media applications. In one embodiment, the techniques herein may be implemented at the transport layer (e.g., TCP layer, etc.). When rate adaptation occurs as a result of a bottlenecked link/device, the system may adapt the rate based on delay whenever possible (e.g., when delay-friendly traffic is the majority of the traffic), on loss, etc. When rate adaptation is based on delay information alone, the system may use a queue delay estimate to enable rate adaptation.

Figure 4A:
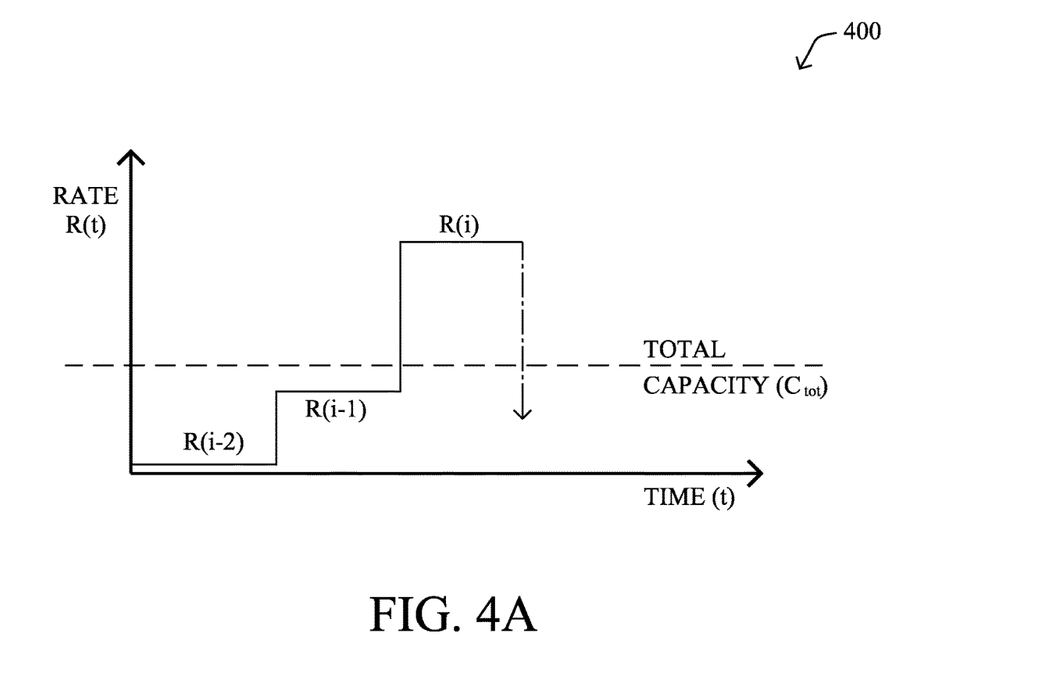
FIGS. 4A-4D illustrate examples of different packet rate ramp up behaviors.

FIGS. 4A-4D illustrate examples of different packet rate ramp ups, according to various embodiments. Referring now to FIG. 4A, an example graph 400 is shown of a ramp up mechanism increasing the packet rate of an application. As shown, the packet rate used by the ramp up mechanism is plotted as a function of time. In some embodiments, the packet rate during any given cycle n may be determined according to a geometric progression, as described above. So long as the queue delay estimate is zero or near zero, the ramp up mechanism may continue to increase the packet rate according to this progression.

Consider the case with respect to FIG. 4A in which the packet rate R(i−1) is slightly below the maximum rate before the total capacity ($C_{tot}$) of the path is reached. In such a case, the geometric progression may be such that the rate increase to R(i) well overshoots the capacity of the path, thereby leading to a congestion bottleneck situation at one of the networking devices along the path.

Figure 4B:
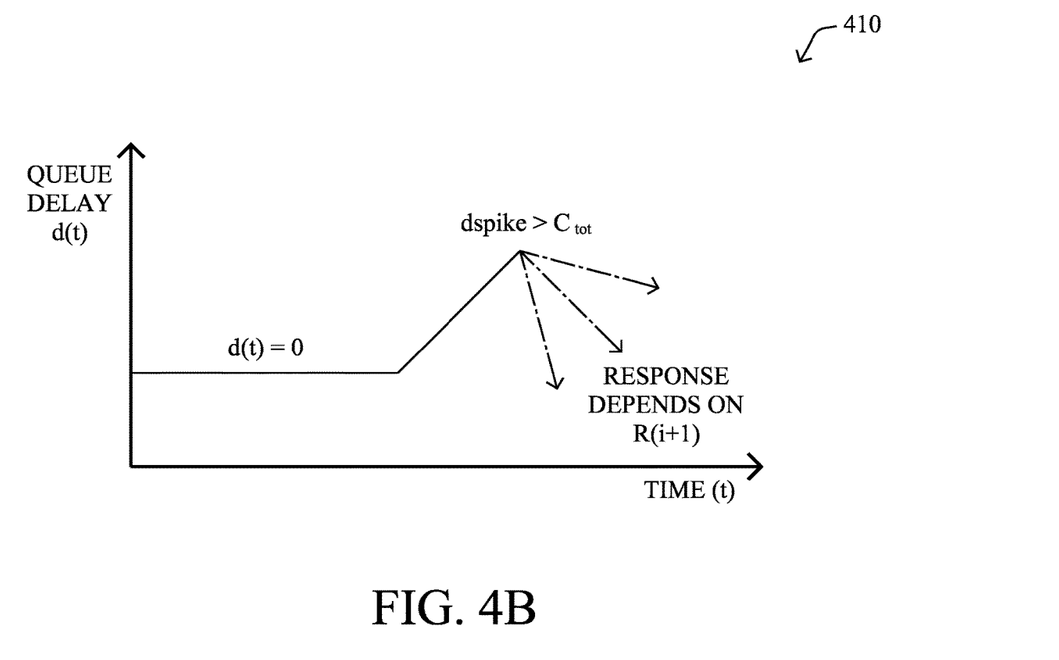

As shown in FIGS. 4A-4B, the ramp up mechanism may be operable to back off the current rate, when queuing delays develop along the path. For example, in graph 410 shown, the amount of queue delay d(t) may increase considerably when packet rate R(i) is used. To alleviate this congestion, the ramp up mechanism may drop the rate to rate R(i+1). As would be appreciated, such a response may depend on how drastically the rate adjustment mechanism cuts the packet rate for R(i+1). In cases in which the rate used in the prior cycle is just shy of causing the capacity to be exceeded, the subsequent rate increase will also result in a very large delay spike (e.g., $d_{spike}$ shown in FIG. 4B may be much greater than the total capacity of the path). This spike will continue to grow until the device learns of the resulting delay and drops its packet rate, in response.

In various embodiments, the ramp up mechanism may be operable to guarantee that no more than a certain amount of queue delay will be added as a result of any given packet rate increase (e.g., added to the hop with the least amount of capacity at which a bottleneck may result). For example, the ramp up mechanism may be configured to ensure that no more than 50 ms of delay may be added. Other amounts of a maximum allowable delay may be used in other cases, as desired. For example, the maximum allowable delay for the ramp up mechanism may be based on the type of traffic (e.g., multimedia traffic may have a lower allowable delay than other types of traffic, such as traffic that is less sensitive to delays).

For purposes of illustration, assume that rate updates occur every RTT interval of time (e.g., the amount of time for the sent packets to be acknowledged by the destination back to the sending device). Note that this may be different than the normal delay based rate adaptation where the rate estimate updates occur more frequently, such as based on feedback using the Real-Time Transport Control Protocol (RTCP) or another control protocol used in the network.

To obtain a bound for the amount of delay added per rate increase cycle, the following assumptions may be made: 1.) the flow is the only one in the bottleneck, 2.) the RTT is the best case delay for the queue measurement to affect bits accumulating at the bottleneck, and 3.) there exists a worst-case practical system delay in obtaining the queue estimate (Δ). The last quantity represents the system delays caused by feedback intervals being different from forward packet measurement intervals (e.g., RTCP feedback every 100 ms) and other measurement processing constraints (e.g., filtering delays from non-linear filters and the like). Thus, in some cases, Δ may have a system constraint component that has a mean of one-half of the nominal acknowledgement (ACK) interval and any delays associated with the measurement process (e.g., 5 point median filter has a two forward-direction sample delay). For example, in one embodiment, Δ may be set as follows:

$$\Delta = \frac{T_{RTCP}}{2}$$

Said differently, it may take a minimum of RTT+Δ amount of time before: 1.) a buildup of the queue at the bottleneck is measurable at the receiver/destination, 2.) the measurement is forwarded back to the sender, 3.) the sender can adjust its packet rate, in response to learning about the queue delay, and 4.) for the new packet rate to affect the queue delay present at the bottleneck device/link. To guarantee that a given packet rate increase does not add more than a maximum allowable delay, two measured quantities may be used: the current queue delay estimate and a recent RTT measurement.

Any packet rate in excess of the capacity for the single flow may result in a queue buildup for the corresponding time period since the latest rate increase. In addition, the rate updates may be assumed to occur at intervals of RTT+Δ. Such an interval does not require a high degree of precision. For example, in some embodiments, the RTT can be the nominal RTT of the last few measurements and Δ may be set as approximately half of the RTCP interval (e.g., 50 ms). In one embodiment, further time may be added to Δ, to represent the possible worst-case time to complete the measurement (e.g., a few tens of milliseconds). Since this phase may occur at session startup prior to an RTT measurement, the RTT may be initialized to a reasonably high value (e.g., 0.5 seconds, etc.) until the first RTT measurement is obtained.

To obtain a worst-case queue delay increase bound, consider the case shown in FIG. 4A in which rate R(i−1) is approximately at the point of exceeding the maximum capacity and the ramp up mechanism has not detected any queue delays at this time. In such a case, the next rate adjustment to R(i) may add its additional bits to the bottleneck queue. In other words, the amount of bits $d_{acc}$ that accumulate in the bottleneck queue that are attributable to the rate increase to R(i) may be calculated as follows:

$$d_{acc} = \frac{R(i) - R(i-1)}{R(i-1)} * T_{recovery}$$

where $T_{recovery}$ is the amount of time before the ramp up mechanism may learn about the queue buildup, alter its packet rate, and alleviate the bottleneck condition. If the number of accumulated bits in the queue is approximately zero prior to the rate change, this also means that the spike in accumulated bits will be equal to $d_{acc}$.

By illustration, when the observed queuing delay is close to zero, it can be deduced that the previous rate choice R(i−1) is below the path capacity C. Therefore, this leads to the following:

$$d_{acc} = \frac{R(i) - C}{C} * T_{recovery} = \left(\frac{R(i)}{C} - 1\right) * T_{recovery} < \left(\frac{R(i)}{R(i-1)} - 1\right) * T_{recovery}$$

In one embodiment, as described above, $T_{recovery}$ may be equal to RTT+Δ, where RTT is based on a recent measurement of the round trip time to acknowledge a sent packet and Δ accounts for any additional system delays. Thus, in one embodiment, $d_{acc}$ may be represented as follows:

$$d_{acc} = \frac{R(i) - R(i-1)}{R(i-1)} * (RTT + \Delta).$$

In various embodiments, the ramp up mechanism may be operable to ensure that any given rate increase does not result in an amount of queue delay that exceeds a maximum allowable delay ($d_{max}$) attributable to any given rate increase may be fixed. To ensure that $d_{max}$ is not exceeded, this gives the following condition:

$$d_{acc} \leq d_{max}.$$

Substituting in the calculation for $d_{acc}$ yields:

$$\frac{R(i) - R(i-1)}{R(i-1)} * (RTT + \Delta) \leq d_{max}.$$

If the rate increase is based on a geometric progression, this means that R(i) may be represented as follows:

$$R(i) = \gamma * R(i-1)$$

where γ is the geometric multiplier/scale factor for the rate increase. This gives the following:

$$\frac{\gamma * R(i-1) - R(i-1)}{R(i-1)} * (RTT + \Delta) \leq d_{max}$$

$$(\gamma - 1) * (RTT + \Delta) \leq d_{max}$$

$$(\gamma - 1) \leq \frac{d_{max}}{(RTT + \Delta)}$$

$$\gamma \leq \frac{d_{max}}{(RTT + \Delta)} + 1$$

-continued $$\gamma \leq \frac{d_{max} + (RTT + \Delta)}{(RTT + \Delta)}$$

Thus, by setting γ equal to the above, any rate increase will be guaranteed to add no more than $d_{max}$ amount of delay. As noted previously, Δ may be used to account for any additional system delays attributable to detecting a bottleneck condition and/or alleviating the condition (e.g., by downwardly adjusting the packet rate). In one embodiment, Δ may be based on the RTCP measurement interval ($T_{RTCP}$), such as the average RTCP interval (e.g., $\Delta = T_{RTCP}/2$). In another embodiment, Δ may be based on the inter-departure times of source packets ($T_P$), such as the average inter-departure time (e.g., $\Delta = T_P/2$). In further embodiments, Δ may be based on both $T_{RTCP}$ and on $T_P$ (e.g., $\Delta = (T_{RTCP}/2) + (T_P/2)$).

Figure 4C:
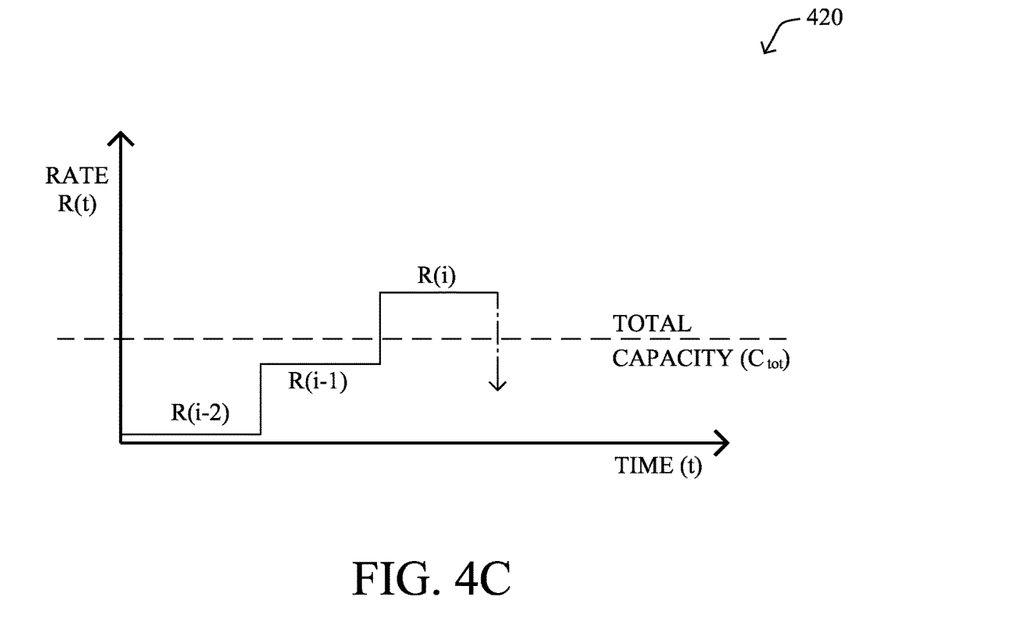
Figure 4D:
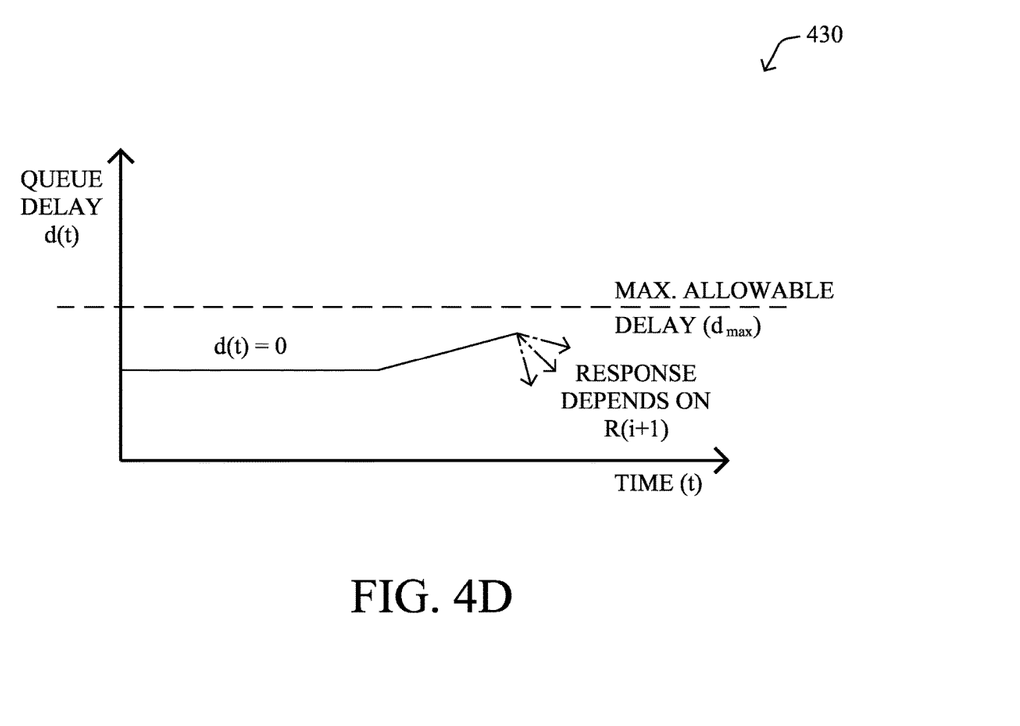

Referring now to FIGS. 4C-4D, graph 420 depicts a geometric (e.g., discretized exponential) ramp up using a bounded amount of added queue delay, according to the techniques herein. The resulting queue delay is shown in graph 430 in FIG. 4D. As shown, although packet rate R(i) still exceeds the total capacity, the resulting delay at the bottleneck is bounded below the maximum allowable delay $d_{max}$. For certain types of traffic, such as multimedia and other forms of traffic, this bounded delay may enhance the user experience and prevent the traffic flow from impinging on other traffic flowing through the network.

Figure 5:
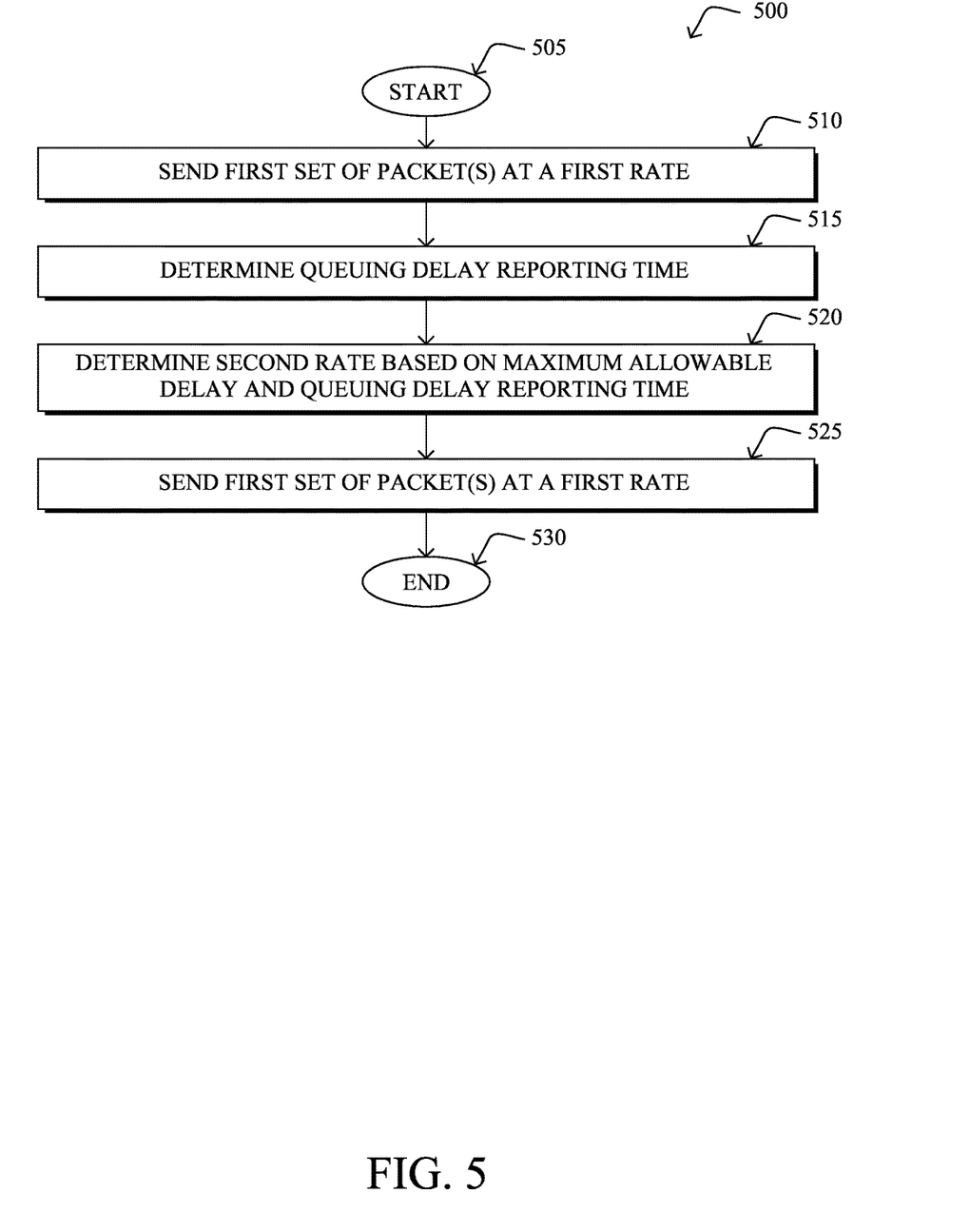
FIG. 5 illustrates an example simplified procedure for performing packet rate ramp up in a network.

Referring now to FIG. 5, an example simplified procedure is shown for performing packet rate ramp up in a network. Procedure 500 may be performed by any device in a network (e.g., device 200) that uses a packet rate ramp up mechanism. The procedure 500 may begin at step 505 and continue on to step 510 where, as described in greater detail above, the device may send a first set of one or more packets at a first packet rate to a destination in the network. The sent traffic may be of any type such as, but not limited to, multimedia traffic (e.g., video, audio, etc.).

At step 515, as described in greater detail above, the device may determine a queuing delay reporting time. In general, this reporting time represents the amount of time before the device is able to learn of a problem along a communication path via which a packet was sent (e.g., a queuing delay experienced by the packet and/or loss of the packet). In one embodiment, the queuing delay reporting time may be based in part on the RTT for packets sent by the device to the destination.

At step 520, as detailed above, the device may determine a second packet rate based in part on the determined queuing delay reporting time and on a maximum allowable queuing delay. In general, the maximum allowable delay provides a worst-case bound for the potential queuing delays that may result from a packet rate increase. In some cases, the maximum allowable delay may be set on a per-application basis, depending on the particular needs of the traffic type to ensure a good user experience. In some embodiments, as detailed above, the second packet rate may be calculated using a geometric progression, with the scale factor for the previous rate being based on the estimated queuing delay reporting time. In further embodiments, the scale factor may be further based on a delta (Δ) value, to account for further system delays associated with the detection and/or alleviation of a detected queuing delay. For example, Δ may be based on the reporting cycle for the control protocol used in the network (e.g., RTCP, etc.). Such a scale factor may, in many cases, fall within the range of 1.0-2.0 times the previous packet rate. However, in other cases, the scale factor may still exceed 2.0 times the previous packet rate, such as in the case where there are very short RTTs, small A values, and loose $d_{acc}$ bounds.

At step 525, the device may send a second set of one or more packets at the second packet rate determined in step 520, as described in greater detail above. By controlling the amount of packet rate increase, the ramp up mechanism of the device may ensure that the potential queuing delay at a bottleneck will never exceed the maximum allowable delay. If a queuing delay is reported back to the device subsequent to using the second packet rate, the device may back off the rate. For example, the device may decrease the packet rate to a third rate, to help alleviate the bottleneck, in some implementations. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a ramp up mechanism to use the fastest rate increase possible (e.g., based on a geometric progression), while ensuring any given rate increase will not add more than a maximum amount of queuing delay at a bottleneck. In contrast, existing ramp up techniques use a fixed multiplier in all cases, which can self-inflict additional delays, particularly on long-RTT connections.

While there have been shown and described illustrative embodiments that provide for a delay-based rate adaptation for packet ramp up, it is to be understood that various other adaptations and modifications may be made within the spirit and scope of the embodiments herein. In addition, while certain protocols are shown, such as RTCP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   sending, by a device in a network, a first set of one or more packets at a first rate to a destination in the network;
   determining, by the device, a queuing delay reporting time, wherein the queuing delay reporting time represents an amount of time before an indication of a queuing delay associated with the sent first set of one or more packets is reported back to the device;
   determining, by the device, whether to increase the first rate to a second rate based on the determined queuing delay reporting time and on a maximum allowable delay, wherein the maximum allowable delay is a worst-case bound for potential queuing delays that result from a packet rate increase and wherein the worst-case bound is based on a queue estimate that represents system delays caused by feedback intervals being different from forward packet measurement intervals;
   increasing, by the device, the first rate to the second rate when the maximum allowable delay will not be exceeded as a result of increasing the first rate to the second rate, wherein determining the second rate comprises:
      calculating, by the device, a scale factor using the determined queuing delay reporting time and the maximum allowable delay, and
      using, by the device, the calculated scale factor in a geometric progression, to determine the second rate; and
   sending, by the device, a second set of packets at the second rate to the destination.

2. The method as in claim 1, wherein the queuing delay reporting time is determined based in part on a round trip time associated with the destination acknowledging a packet received from the device.

3. The method as in claim 2, wherein the queuing delay reporting time is determined based in part on an estimate of additional system response time associated with the device receiving the indication of the queuing delay.

4. The method as in claim 3, wherein the estimate of additional system response time is based on a feedback interval for a control protocol used in the network.

5. The method as in claim 4, wherein the control protocol is the Real-Time Transport Control Protocol (RTCP).

6. The method as in claim 1, wherein the scale factor is within the range of 1.5-2.0.

7. The method as in claim 1, further comprising:
   determining, by the device, that the sent second set of one or more packets has resulting in a queuing delay; and
   sending, by the device, a third set of one or more packets at a third rate, wherein the third rate is lower than that of the second rate.

8. The method as in claim 1, wherein the maximum allowable delay is based on an application associated with the sent packets.

9. An apparatus, comprising:
   one or more network interfaces to communicate with a network;
   a processor coupled to the one or more network interfaces and configured to execute a process; and
   a memory configured to store the process executable by the processor, the process when executed operable to:
      send a first set of one or more packets at a first rate to a destination in the network;
      determine a queuing delay reporting time, wherein the queuing delay reporting time represents an amount of time before an indication of a queuing delay associated with the sent first set of one or more packets is reported back to the apparatus;
      determine whether to increase the first rate to a second rate based on the determined queuing delay reporting time and on a maximum allowable delay, wherein the maximum allowable delay is a worst-case bound for potential queuing delays that result from a packet rate increase and wherein the worst-case bound is based on a queue estimate that represents system delays caused by feedback intervals being different from forward packet measurement intervals;

increase the first rate to the second rate when the maximum allowable delay will not be exceeded as a result of increasing the first rate to the second rate, wherein determining the second rate comprises:
    calculating, by the device, a scale factor using the determined queuing delay reporting time and the maximum allowable delay, and
    using, by the device, the scale factor in a geometric progression, to determine the second rate; and
send a second set of packets at the second rate to the destination.

10. The apparatus as in claim 9, wherein the queuing delay reporting time is determined based in part on a round trip time associated with the destination acknowledging a packet received from the apparatus.

11. The apparatus as in claim 10, wherein the queuing delay reporting time is determined based in part on an estimate of additional system response time associated with the apparatus receiving the indication of the queuing delay.

12. The apparatus as in claim 11, wherein the estimate of additional system response time is based on a feedback interval for a control protocol used in the network.

13. The apparatus as in claim 12, wherein the control protocol is the Real-Time Transport Control Protocol (RTCP).

14. The apparatus as in claim 9, wherein the scale factor is within the range of 1.5-2.0.

15. The apparatus as in claim 9, wherein the process when executed is further operable to:
    determine that the sent second set of one or more packets has resulting in a queuing delay; and
    send a third set of one or more packets at a third rate, wherein the third rate is lower than that of the second rate.

16. The apparatus as in claim 9, wherein the maximum allowable delay is based on an application associated with the sent packets.

17. A tangible, non-transitory, computer-readable media having software encoded thereon, the software when executed by a processor of a device is operable to:
    send a first set of one or more packets at a first rate to a destination in the network;
    determine a queuing delay reporting time, wherein the queuing delay reporting time represents an amount of time before an indication of a queuing delay associated with the sent first set of one or more packets is reported back to the device;
    determine whether to increase the first rate to a second rate based on the determined queuing delay reporting time and on a maximum allowable delay, wherein the maximum allowable delay is a worst-case bound for potential queuing delays that result from a packet rate increase and wherein the worst-case bound is based on a queue estimate that represents system delays caused by feedback intervals being different from forward packet measurement intervals;
    increase the first rate to the second rate when the maximum allowable delay will not be exceeded as a result of increasing the first rate to the second rate, wherein determining the second rate comprises:
        calculating, by the device, a scale factor using the determined queuing delay reporting time and the maximum allowable delay, and
        using, by the device, the calculated scale factor in a geometric progression, to determine the second rate; and
    send a second set of packets at the second rate to the destination.

18. The computer-readable media as in claim 17, wherein the queuing delay reporting time is determined based in part on a round trip time associated with the destination acknowledging a packet received from the device, and wherein the queuing delay reporting time is determined based in part on an estimate of additional system response time associated with the device receiving the indication of the queuing delay.

* * * * *